United States Patent [19]
Lee

[11] Patent Number: 5,327,186
[45] Date of Patent: Jul. 5, 1994

[54] MULTI-DIRECTION REMOTE CONTROL UNIT FOR AN ELECTRONIC APPARATUS

[75] Inventor: Min-soo Lee, Suwon City, Rep. of Korea

[73] Assignee: SamSuung Electronics Co., Ltd., Kyungki-do, Rep. of Korea

[21] Appl. No.: 61,264

[22] Filed: May 17, 1993

[30] Foreign Application Priority Data

May 26, 1992 [KR] Rep. of Korea .................. 92-9141

[51] Int. Cl.[5] .................. G03B 17/02; G03B 17/38
[52] U.S. Cl. .................. 354/266; 354/288; 348/211; 348/375
[58] Field of Search .................. 354/266, 288, 403; 358/210, 229; 318/640

[56] References Cited

U.S. PATENT DOCUMENTS

| | | | |
|---|---|---|---|
| 4,905,315 | 2/1990 | Solari et al. | 318/640 |
| 4,928,179 | 5/1990 | Takahashi et al. | 358/210 |
| 5,159,378 | 10/1992 | Takada et al. | 354/403 |
| 5,172,155 | 12/1992 | Kosaka | 354/266 X |

Primary Examiner—Michael L. Gellner
Assistant Examiner—J. K. Han
Attorney, Agent, or Firm—Sughrue, Mion, Zinn, Macpeak & Seas

[57] ABSTRACT

A remote control unit of an electronic apparatus has a receiving device provided in a cabinet of the electronic apparatus and a remote controller having a plurality of control buttons for controlling the electronic apparatus. The receiving device has a transparent module and a plurality of receiving sensors disposed in the transparent module. A housing encloses the module and protrudes out of the upper section of the cabinet. The receiving device can be protruded from or retracted into the upper section of the cabinet allowing the electronic apparatus to be controlled from any direction.

5 Claims, 2 Drawing Sheets

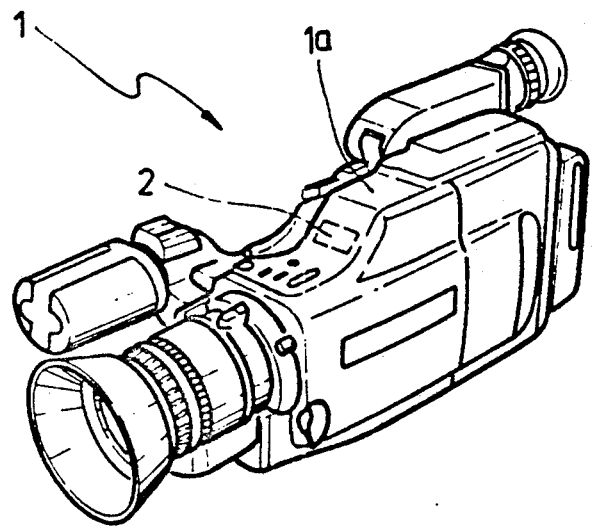
FIG. 2
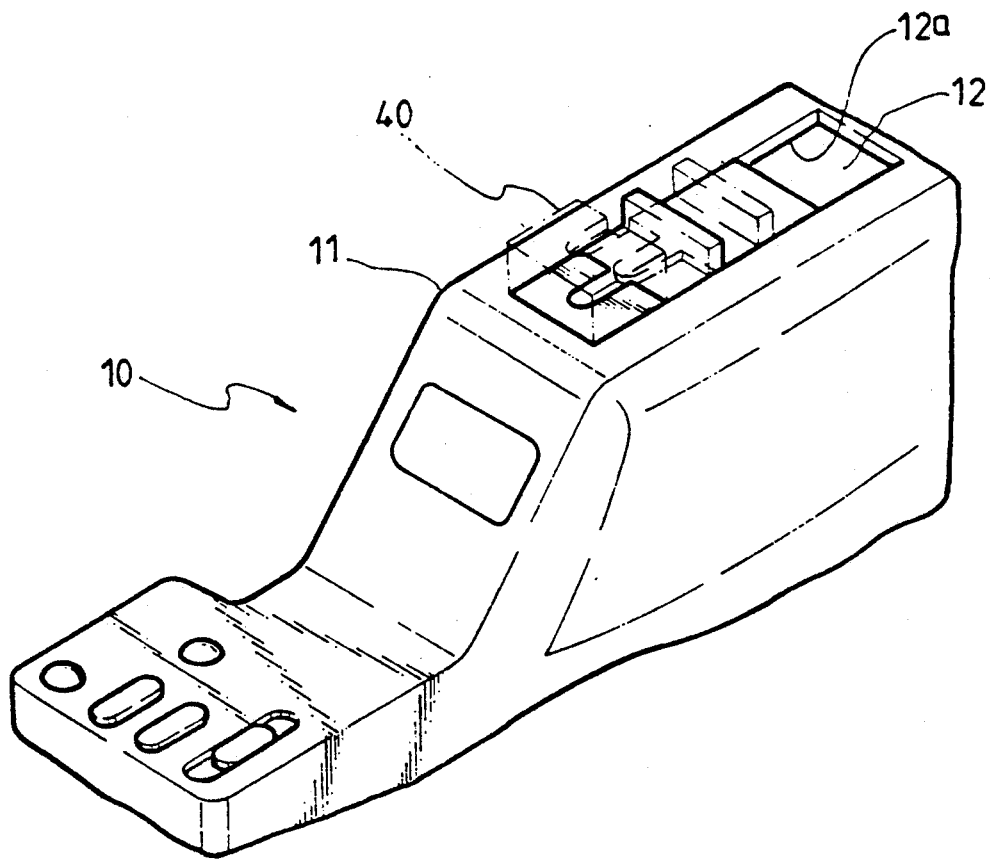

MULTI-DIRECTION REMOTE CONTROL UNIT FOR AN ELECTRONIC APPARATUS

BACKGROUND OF THE INVENTION

1. Field of the Invention

The present invention relates to a remote control unit of an electronic apparatus, and in more detail, to a remote controller receiving apparatus which has been improved to facilitate reception of the signal emitted from the remote controller in any direction.

2. Description of the Related Art

In general, electronic apparatuses such as televisions, audio and video players, camcorders, etc., utilize a remote control device for simplifying the manipulation thereof. FIG. 1 shows a conventional electronic apparatus utilizing a remote control device.

The apparatus 1 has a receiver unit 2 for controlling each function of the apparatus 1 provided on the front panel of a cabinet 1a thereof, and a separate remote controller (not shown) separately manufactured. The remote controller has various buttons for manipulating respective functions of the apparatus 1 and a transmitter unit for transmitting preset control signals to the receiver unit 2 in response to the operation of the buttons.

The remote control device described above, wherein a receiver unit 2 is installed on the front panel of a cabinet 1a of the apparatus has limitations. For example, apparatus cannot be remotely controlled when the remote controller is positioned beyond a certain angle laterally or to the rear thereof.

SUMMARY OF THE INVENTION

The object of the present invention is to provide a remote control unit of an electronic apparatus which enhances the usefulness of the electronic apparatus by providing for control thereof in any direction.

To accomplish the above object, the present invention provides an electronic apparatus having a remote controller unit having receiver means installed in the cabinet thereof, and a remote controller having a plurality of buttons for manipulating the electronic apparatus. The receiver means is a transparent module having a plurality of at least three or more receiving sensors therein. A housing having the transparent module therein moves upward out of the cabinet in response to the operation of a withdrawing device.

The present invention as described as above is devised to have the transparent module having the receiving sensors therein in the body section of the housing so the module is exposed according to the operation of the withdrawing device, which facilitates remote-controlling from any direction, by a remote controller.

BRIEF DESCRIPTION OF THE DRAWINGS

The above objects and other advantages of the present invention will become more apparent by describing in detail a preferred embodiment thereof with reference to the attached drawings in which:

FIG. 1 is a perspective view showing an embodiment of a remote control unit of the conventional electronic apparatus;

FIG. 2 is a perspective view showing a remote control unit of an electronic apparatus according to the preferred embodiment of the present invention.

DETAILED DESCRIPTION OF THE PREFERRED EMBODIMENT

Figure 3:
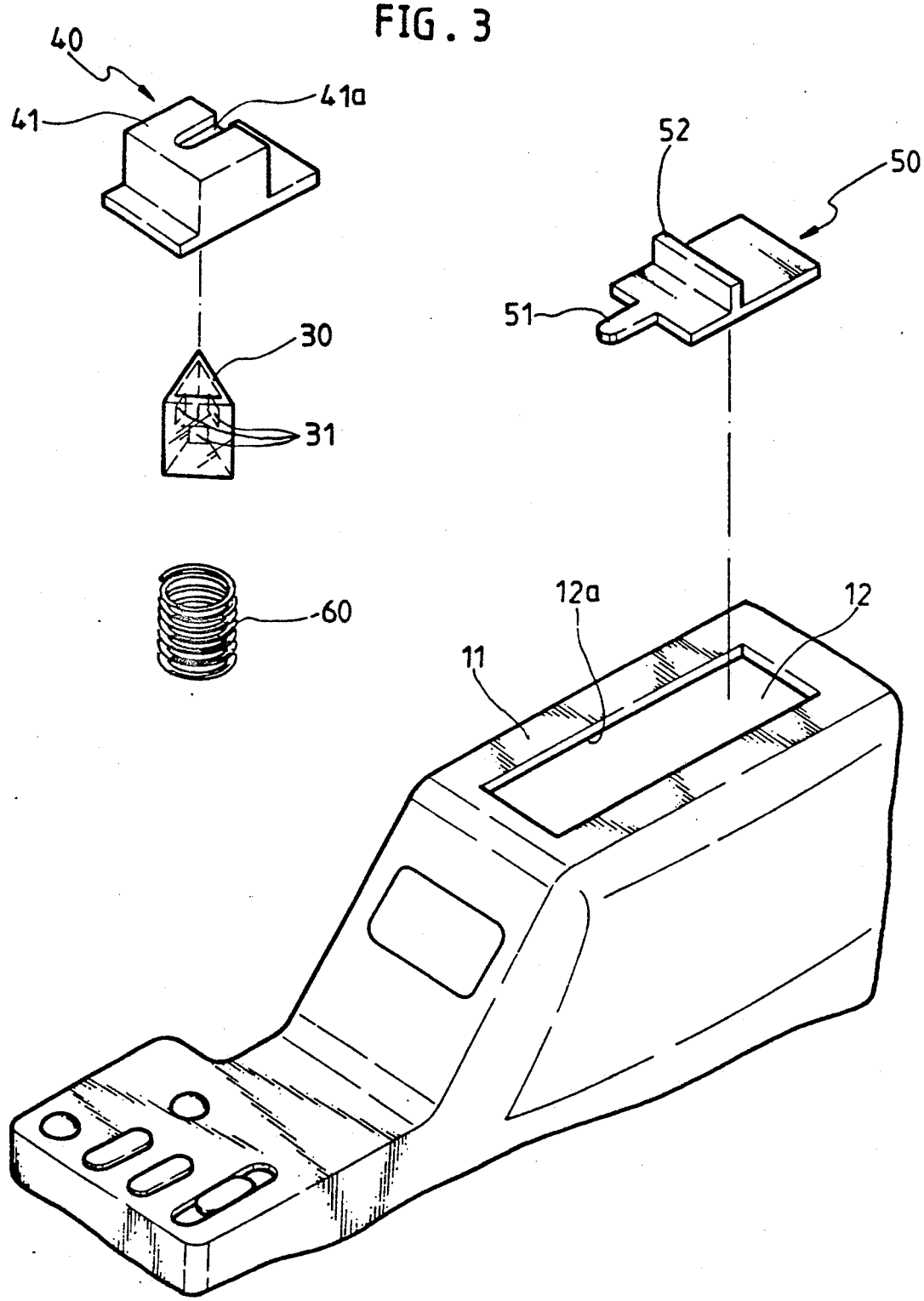
FIG. 3 is a partly exploded perspective view of the electronic apparatus according to the preferred embodiment of the present invention.

A remote control unit of an electronic apparatus according to the preferred embodiment has receiving means positioned on the front panel of a cabinet 11 of an electronic apparatus 10 (e.g., a camcorder) and a remote controller (unshown) having a plurality of control buttons for controlling the electronic apparatus 10.

The receiving means consists of a rectangular groove 12 formed in the longitudinal direction of cabinet 11 of the electronic apparatus 10 on the front panel thereof, and having a guide rail 12a installed therein. Also, a housing 40 has a transparent module 30 disposed therein. The transparent module has at least three receiving sensors 31 and is housed in a protruded body section 41 of the housing 40. The housing 40 is installed in the rectangular groove 12. Transparent module 30 is preferably formed into a triangular prism shape. Further, housing 40 is caused to selectively protrude out of the upper part of cabinet 11 by a withdrawing device.

The withdrawing device consists of a supporting groove 41a formed on one side of protruded body section 41 of the housing 40 and a supporting panel 50 having a supporting protrusion 51 formed on one end thereof so as to engage with the housing 40 by being inserted in supporting groove 41a when the supporting panel 50 is slid towards the housing 40. The supporting panel 50 is provided with withdrawing grip 52 on the front surface thereof and is slidable along guide rail 12a formed in the rectangular groove 12 of the cabinet 11. A spring 60 elastically biases knob 40 towards the upper part of cabinet by being interposed between portions of the cabinet 11 and the knob 40.

Firstly, in a remote control unit of an electronic apparatus in accordance with the present invention as above described, to remotely control the electronic apparatus, the withdrawing grip 52 of the supporting panel 50 is moved so as to disengage the supporting protrusion 51 of the supporting panel 50 from the supporting groove 41a of the housing 40. Thereby, the housing 40 is caused to protrude upward from the cabinet 11 by virtue of force of the spring 60. The housing 40 is prevented from being separated from the cabinet 11 by the supporting 51 of the supporting panel 50 which is engaged with lower portions of the housing 40 in this state.

In the above-described condition, when the remote controller (unshown) is operated, the manipulation of the electronic apparatus can be achieved from any direction by virtue of one of at least three receiving sensors 31 which are located on the transparent module 30 provided in the body section 41 of the housing 40 because the sensors 31 are arranged to face in various directions.

On the other hand, when the housing 40 is to be withdrawn into cabinet 11 for protection from sudden external impacts, the housing 40 is pressed downward by the operator and the supporting panel 50 is moved toward the housing 40. Thus, the supporting protrusion 51 of the supporting panel 50 can be engaged in the supporting groove 41a arranged on the body section 41 of the housing 40, so that the housing 40 can be retracted within the cabinet 11. Accordingly, the housing 40 can be protected from exterior impacts.

As described above, a remote control unit of an electronic apparatus according to the present invention enables the receiving means to be withdrawn from and retracted into the upper section of the cabinet, so that an electronic apparatus can be controlled from any direction, which improves the originally intended function of the remote control of an electronic apparatus, and further enhances reliability of the product.

The invention has been described through a preferred embodiment. However, various modifications can be made thereto without departing from the scope of the invention as defined by the appended claims.

What is claimed is:

1. An electronic apparatus having a remote control unit installed in a cabinet thereof, said remote control unit comprising:
   a module housing mounted on said cabinet;
   a transparent module disposed in said module housing; and
   a plurality of receiving sensors disposed in said transparent module and being directed in different radial directions with respect to said transparent module.

2. An electronic apparatus having a remote control unit installed in a cabinet thereof, said remote control unit comprising:
   a module housing mounted on said cabinet;
   a transparent module disposed in said module housing; and
   a plurality of receiving sensors disposed in said transparent module and being directed in different radial directions with respect to said transparent module, said remote control unit further comprising:
   withdrawing means for allowing said module housing to move between a first position and a second position, in said first position said module housing protrudes from said cabinet to a first extent, in said second position said module housing protrudes from said cabinet to a second extent or is completely withdrawn into said cabinet, said second extent being less than said first extent.

3. An electronic apparatus as claimed in claim 2, wherein said withdrawing means comprises:
   a rectangular groove formed along the longitudinal direction of said cabinet;
   a guide disposed in said cabinet proximate said rectangular groove;
   a supporting groove formed on said module housing;
   a supporting panel having a supporting protrusion and a withdrawing grip formed thereon, said supporting panel being slidably mounted on said guide rail so as to allow said supporting protrusion to be engaged with said supporting groove when said supporting panel is slid toward said module housing to thereby retain said module housing in said second position; and
   a biasing member disposed between said cabinet and said module housing for biasing said module housing towards said first position.

4. An electronic apparatus as claimed in claim 3, wherein said transparent module is of a triangular prism shape.

5. An electronic apparatus as claimed in claim 3, having at least three of said receiving sensors.

* * * * *